(12) United States Patent
Akl et al.

(10) Patent No.: US 12,324,038 B2
(45) Date of Patent: Jun. 3, 2025

(54) SIGNALING TO SUPPORT RAN MANAGEMENT FOR LOCAL TRAFFIC

(71) Applicant: QUALCOMM Incorporated, San Diego, CA (US)

(72) Inventors: Naeem Akl, Somerville, NJ (US); Karl Georg Hampel, Hoboken, NJ (US); Luis Fernando Brisson Lopes, Swindon (GB); Ozcan Ozturk, San Diego, CA (US); Sebastian Speicher, Wallisellen (CH); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 17/516,282

(22) Filed: Nov. 1, 2021

(65) Prior Publication Data

US 2023/0135848 A1 May 4, 2023

(51) Int. Cl.
*H04W 76/15* (2018.01)
*H04W 4/20* (2018.01)
*H04W 28/02* (2009.01)

(52) U.S. Cl.
CPC ............ *H04W 76/15* (2018.02); *H04W 4/20* (2013.01); *H04W 28/0252* (2013.01); *H04L 2212/00* (2013.01)

(58) Field of Classification Search
None
See application file for complete search history.

(56) References Cited

U.S. PATENT DOCUMENTS

| | | |
|---|---|---|
| 2021/0076368 A1 | 3/2021 | Malkamäki et al. |
| 2023/0189199 A1* | 6/2023 | Hao ........................ H04W 76/27 |
| | | 455/456.1 |
| 2023/0209402 A1* | 6/2023 | Ronkainen ............ H04W 8/082 |
| | | 370/229 |
| 2023/0239757 A1* | 7/2023 | Huang .............. H04W 36/0005 |
| | | 370/331 |

(Continued)

OTHER PUBLICATIONS

International Search Report and Written Opinion—PCT/US2022/077522—ISA/EPO—Jan. 25, 2023.

(Continued)

*Primary Examiner* — Saumit Shah
(74) *Attorney, Agent, or Firm* — Arent Fox, LLP

(57) ABSTRACT

Example implementations include a method, apparatus, and computer-readable medium of wireless communication for a network node to transport signaling used to coordinate management of a RAN for local traffic between a first node and a UE across a wireless connection. The network node may establish a first wireless signaling connection between a first node and a second node. The network node may encapsulate or decapsulate traffic associated with a second wireless signaling connection within the first wireless signaling connection. The second wireless signaling connection corresponds to a non-F1 interface of a control plane or user plane network function that terminates at the first node. For instance, the network node may be a consumer premises equipment (CPE) serving a UE, a base station wirelessly serving the CPE, or a core network node providing control for the UE.

30 Claims, 12 Drawing Sheets

(56) References Cited

U.S. PATENT DOCUMENTS

2024/0236761 A1* 7/2024 Lagrange .......... H04W 28/0289
2024/0259866 A1* 8/2024 Yi ........................... H04L 45/74

OTHER PUBLICATIONS

LG Electronics Inc: "Comparison with CP Alternatives for Architecture 1A", 3GPP TSG-RAN WG3 #101bis, R3-186023, 3rd Generation Partnership Project, Mobile Competence Centre, 650, Route Des Lucioles, F-06921 Sophia-Antipolis Cedex, vol. RAN WG3, No. Chengdu, China, Oct. 8, 2018-Oct. 12, 2018, Sep. 29, 2018, XP051529289, 6 pages, paragraphs [02. 2], [8. 3. 4].

VODAFONE: "Location of User Plane Security Termination Point in the Network / Input for Response to SA3 LS in S3-170408=S2-171637", SA WG2 Meeting #119, S2-172289, 3rd Generation Partnership Project, Mobile Competence Centre, 650, Route Des Lucioles, F-06921 Sophia-Antipolis Cedex, France, vol. SA WG2, No. Dubrovnik, Croatia, Feb. 13, 2017-Feb. 17, 2017, Mar. 28, 2017, XP051248352, pp. 1-5, figures 1,2,3.

ZTE et al., "Control Plane Signaling Delivery in NSA Deployment", 3GPP TSG RAN WG2 Meeting #104, R2-1817420, 3rd Generation Partnership Project, Mobile Competence Centre, 650, Route Des Lucioles, F-06921 Sophia-Antipolis Cedex, vol. RAN WG2, No. Spokane, USA, Nov. 12, 2018-Nov. 16, 2018, Nov. 12, 2018, XP051556951, 6 Pages, paragraph [02.1].

* cited by examiner

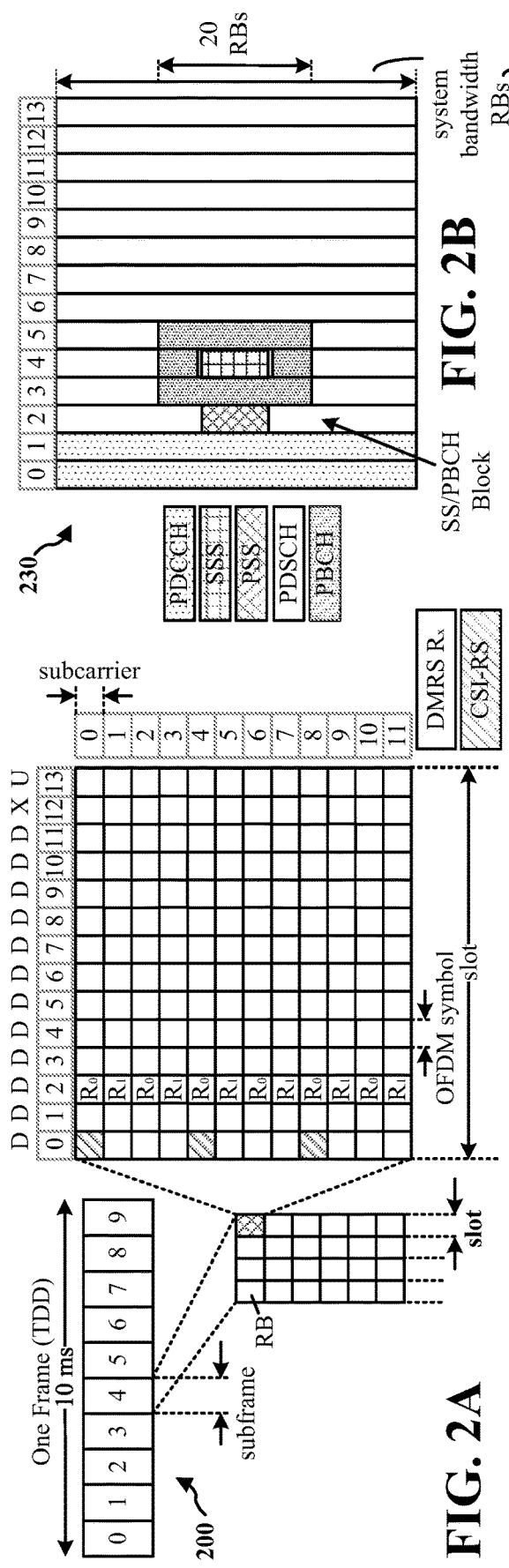
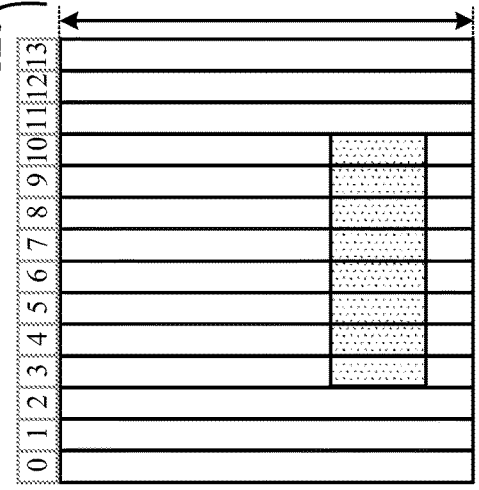
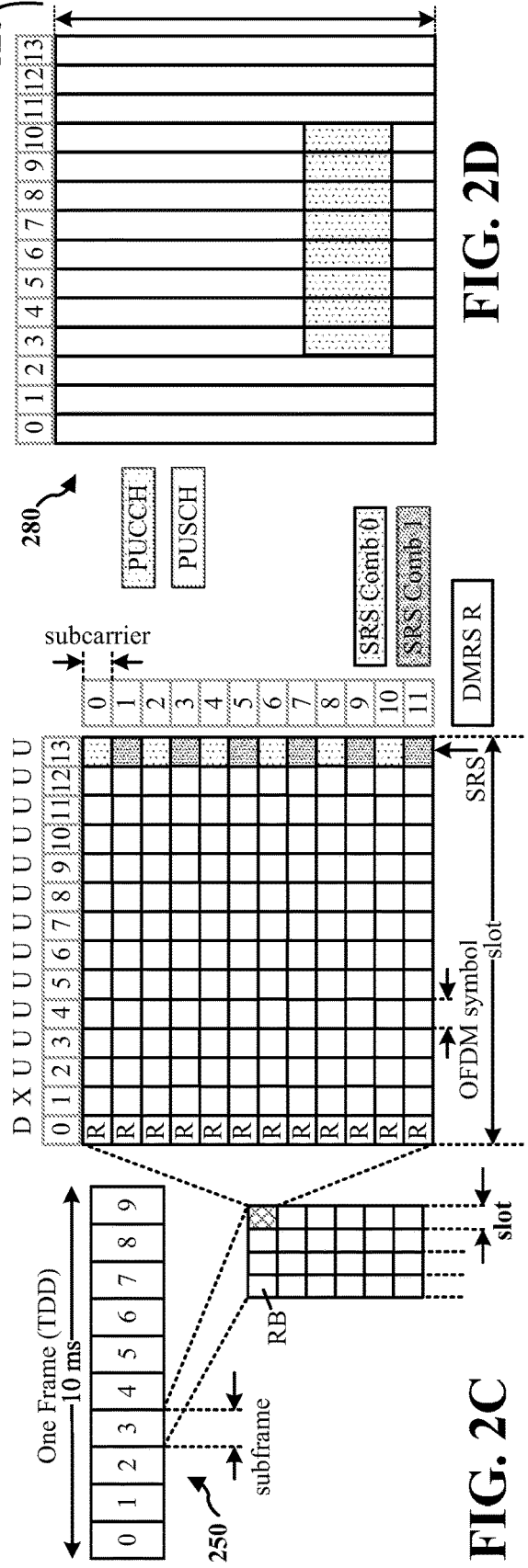
FIG. 2A
FIG. 2B
FIG. 2C
FIG. 2D

SIGNALING TO SUPPORT RAN MANAGEMENT FOR LOCAL TRAFFIC

BACKGROUND

Technical Field

The present disclosure relates generally to communication systems, and more particularly, to apparatus and methods of signaling to support radio access network (RAN) management for local traffic.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure provides a method, apparatus, and non-transitory computer readable medium for a network node to transport signaling used to coordinate management of a radio access network (RAN) for local traffic between a first node and a UE across a wireless connection. The method may include establishing a first wireless signaling connection between a first node and a second node. The method may include encapsulating or decapsulating traffic associated with a second wireless signaling connection within the first wireless signaling connection. The second wireless signaling connection corresponds to a non-F1 interface of a control plane or user plane network function that terminates at the first node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of UL channels within a subframe.

DETAILED DESCRIPTION

Figure 1:
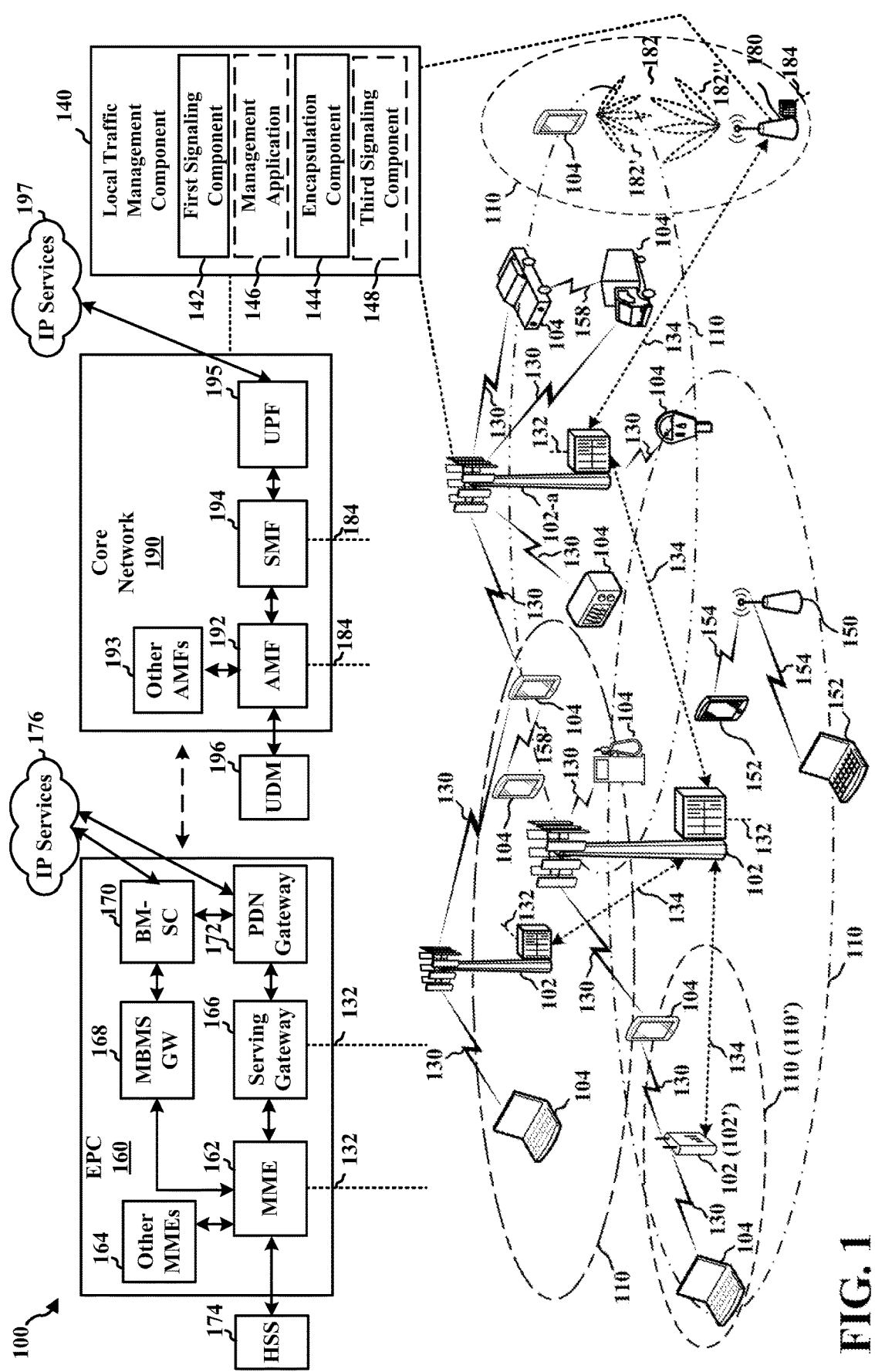
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A customer premises equipment (CPE) may utilize a wireless access link between a base station and the CPE. The CPE may serve as a base station for UEs at the customer premise (e.g., a home or business). Proposed deployment scenarios for CPE may involve various control plane signaling between the CPE and various network nodes. For example, Xn signaling between the local gNB of the CPE and a macro gNB may support mobility and/or multiplexing of radio resources for in-band operation. As another example, NG-C signaling between the local gNB and a next generation core (NGC) for the UE may support UE non-access stratum (NAS) signaling. As another example, local breakout traffic (e.g., between two UEs connected to the CPE) may utilize E1 signaling between a CU-user plane (CU-UP) and CU-control plane (CP). The CU-UP may be local at the CPE node and the CU-CP may be located at a macro base station or IAB-donor. In some implementations, local breakout traffic may utilize N4 signaling between a local user plane function (UPF) and the NGC for the UE. The signaling between the various network nodes to support the CPE may involve transport over a wireless link between the CPE and a base station.

One proposed architecture to support CPE is an integrated access and backhaul (IAB) network that utilizes over the air (OTA) resources for both access for user equipment (UE) and backhaul between network entities such as base stations and a core network. For example, a network entity with a wireline connection to a core network may be referred to as an IAB-donor central unit (CU), which may communicate with an IAB distributed unit (DU) located at an IAB-node. The IAB-node may include a mobile terminal (MT) section to support a wireless connection between the CU and DU. For example, an RRC connection may connect an IAB-MT of the IAB-node with an IAB-donor-CU. The backhaul link between the IAB-DU and the IAB-donor CU may be referred to as an F1 connection and include one or more wireless links.

Another proposed architecture to support CPE is back-to-back arrangement of UEs and gNBs. For example, the CPE may include both a gNB that serves UEs and a UE that connects to a macro base station. In some implementations, the connection between the UE of the CPE and the macro base station may be referred to as fixed wireless access (FWA). To distinguish between the UE within the CPE and the UEs served by the CPE, the UE within the CPE may be referred to as an FWA-UE, and the macro base station may be referred to as a FWA-gNB. Under either the first architecture or the second architecture, signaling to support a network function that terminates at the CPE may be transported over a wireless connection between the CPE and a base station.

In an aspect, the present disclosure provides for encapsulation of signaling to support a non-F1 interface of a control plane or user plane network function within another wireless signaling connection. The non-F1 interface may provide RAN management for local traffic. For example, in the case of a CPE, local traffic may refer to communications between the CPE and a UE. The signaling to support RAN management may include signaling between the CPE and a serving base station (e.g., Xn signaling and E1 signaling) or between the CPE and the core network (e.g., NG signaling or N4 signaling). The wireless signaling connection that encapsulates the RAN management signaling may be a connection that supports a FWA-UE or IAB-node of the CPE. For example, the encapsulating wireless signaling connection may be RRC signaling, NAS signaling, or a combination thereof. The encapsulated signaling to support RAN management may be bi-directional. Accordingly, the CPE may encapsulate and/or decapsulate the encapsulated signaling to support RAN management. Similarly, the other network node (e.g., the serving base station or core network node) may encapsulate or decapsulate signaling to support RAN management.

Although present disclosure may be focused on 5G implementations as examples, the various aspects of the present document may, for example, be applicable to subsequent variations and implementations such as, for example, 5G Advanced, 6G, and the like. Some implementations may be applicable to other similar areas, such as LTE, LTE-A, CDMA, GSM, and other wireless technologies.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

In an aspect, one or more of the base stations 102 may be a CPE 180 that provides service to one or more UEs 104. The one or more UEs 104 connected to the CPE 180 may communicate among each other. The CPE 180 may communicate with one or more other network nodes such as a macro base station 102-a or a node in the core network 190 to provide RAN management of local traffic between the CPE 180 and the one or more UEs. For example, the CPE 180 may be an IAB node and may communicate with another base station (e.g., base station 102-a) via a wireless third backhaul link 134. In some implementations, the wireless third backhaul link 134 may be a FWA link. The base station 102-a may also be an IAB node or may be a central unit (CU) having a first backhaul link 132.

One or more network nodes such as the CPE 180, the macro base station 102-a, or a node in the core network 190 such as the AMF 192, SMF 194, or UPF 195 may include a local traffic management component 140. The local traffic management component 140 may communicate signaling for RAN management of local traffic with another network node including a local traffic management component 140. For example, the local traffic management component 140 may include a first signaling component 142 configured to establish a first wireless signaling connection between a first node and a second node. The local traffic management component 140 may include an encapsulation component 144 configured to encapsulate or decapsulate traffic associated with a second wireless signaling connection within the first wireless signaling connection. The second wireless signaling connection is used to coordinate management of a RAN for local traffic between the first node and a UE.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 130 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 130 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. For example, the CPE 180 may utilize beamforming 182 with the UE 104 to compensate for the path loss and short range.

The CPE 180 may transmit a beamformed signal to the UE 104 in one or more transmit directions 182'. The UE 104 may receive the beamformed signal from the CPE 180 in one or more receive directions 182". The UE 104 may also transmit a beamformed signal to the CPE 180 in one or more transmit directions. The CPE 180 may receive the beamformed signal from the UE 104 in one or more receive directions. The CPE 180/UE 104 may perform beam training to determine the best receive and transmit directions for each of the CPE 180/UE 104. The transmit and receive directions for the CPE 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR implementations, the concepts described herein may be applicable to other similar areas, such as LTE, LTE-A, CDMA, GSM, and other wireless technologies as well as subsequent variations and implementations such as, for example, 5G Advanced, 6G, and the like.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be time divisional duplexed (TDD), with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB)(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative acknowledgement (NACK) feedback. The PUSCH carries data, and may additionally be used to carry a buffer status report (BSR), a power headroom report (PHR), and/or UCI.

Figure 3:
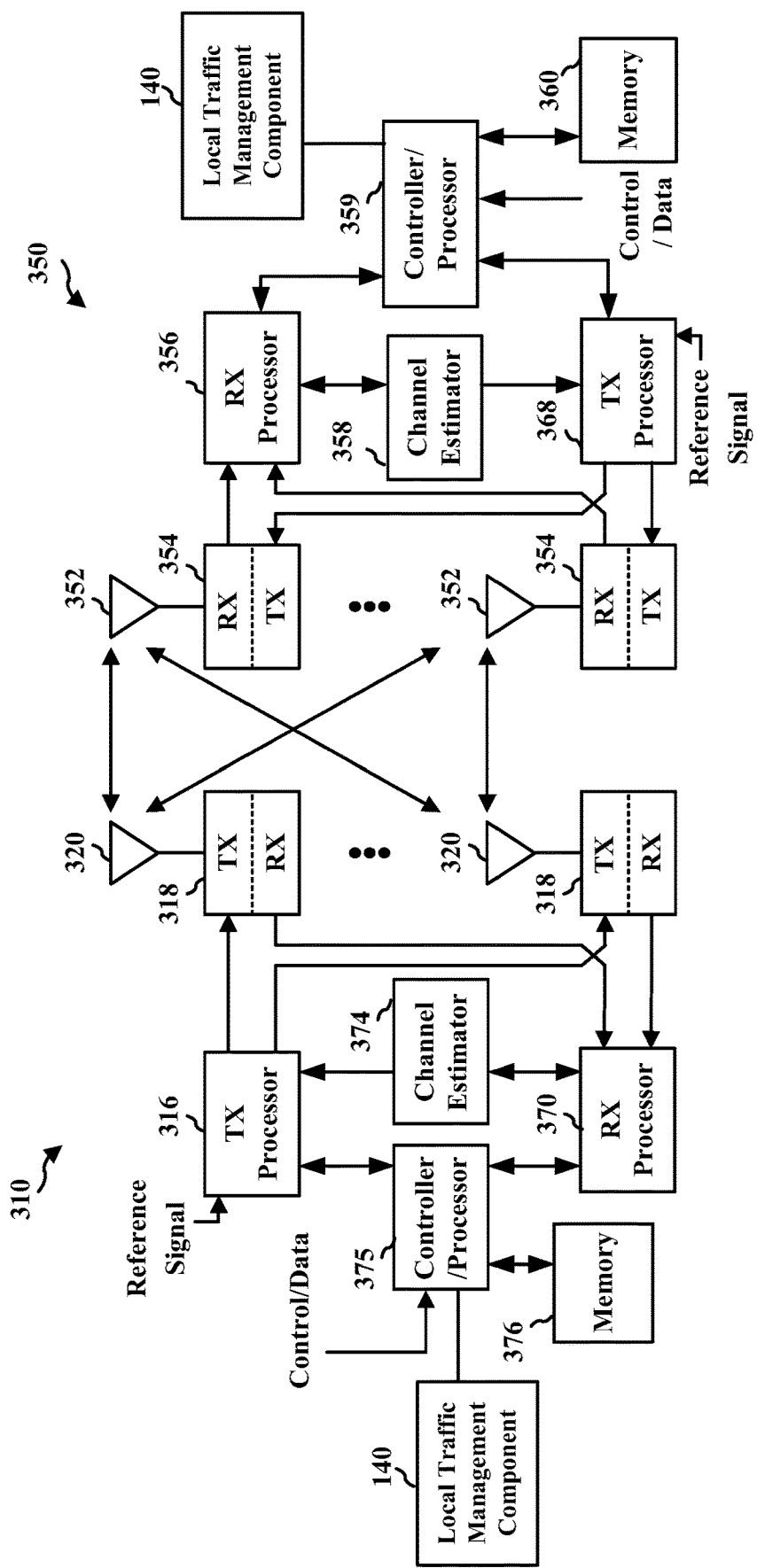
FIG. 3 is a diagram illustrating an example of a base station and user equipment (UE) in an access network.

FIG. 3 is a block diagram of a parent IAB node 310 in communication with a child IAB node 350 in an IAB network. In an IAB network, the procedures for communication between a base station and a UE may be reused for a third backhaul links 134 between IAB nodes. For example, the parent IAB node 310 may perform the actions of a base station in an access network and a child IAB node 350 may perform the actions of a UE in an access network to implement a wireless third backhaul link 134.

In the DL, IP packets from the EPC 160 or core network 190 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the child IAB node 350. Each spatial stream may then be provided to a different antenna 320 via a separate transmitter 318TX. Each transmitter 318TX may modulate an RF carrier with a respective spatial stream for transmission.

At the child IAB node 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the child IAB node 350. If multiple spatial streams are destined for the child IAB node 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the parent IAB node 310. These soft decisions may be based on channel estimates computed by the channel estimator 358. The soft decisions are then decoded and deinterleaved to recover the data and control signals that were originally transmitted by the parent IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the parent IAB node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the parent IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the parent IAB node 310 in a manner similar to that described in connection with the receiver function at the child IAB node 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the child IAB node 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the local traffic management component 140 of FIG. 1.

At least one of the TX processor 316, the RX processor 370, and the controller/processor 375 may be configured to perform aspects in connection with the local traffic management component 140 of FIG. 1.

Figure 4:
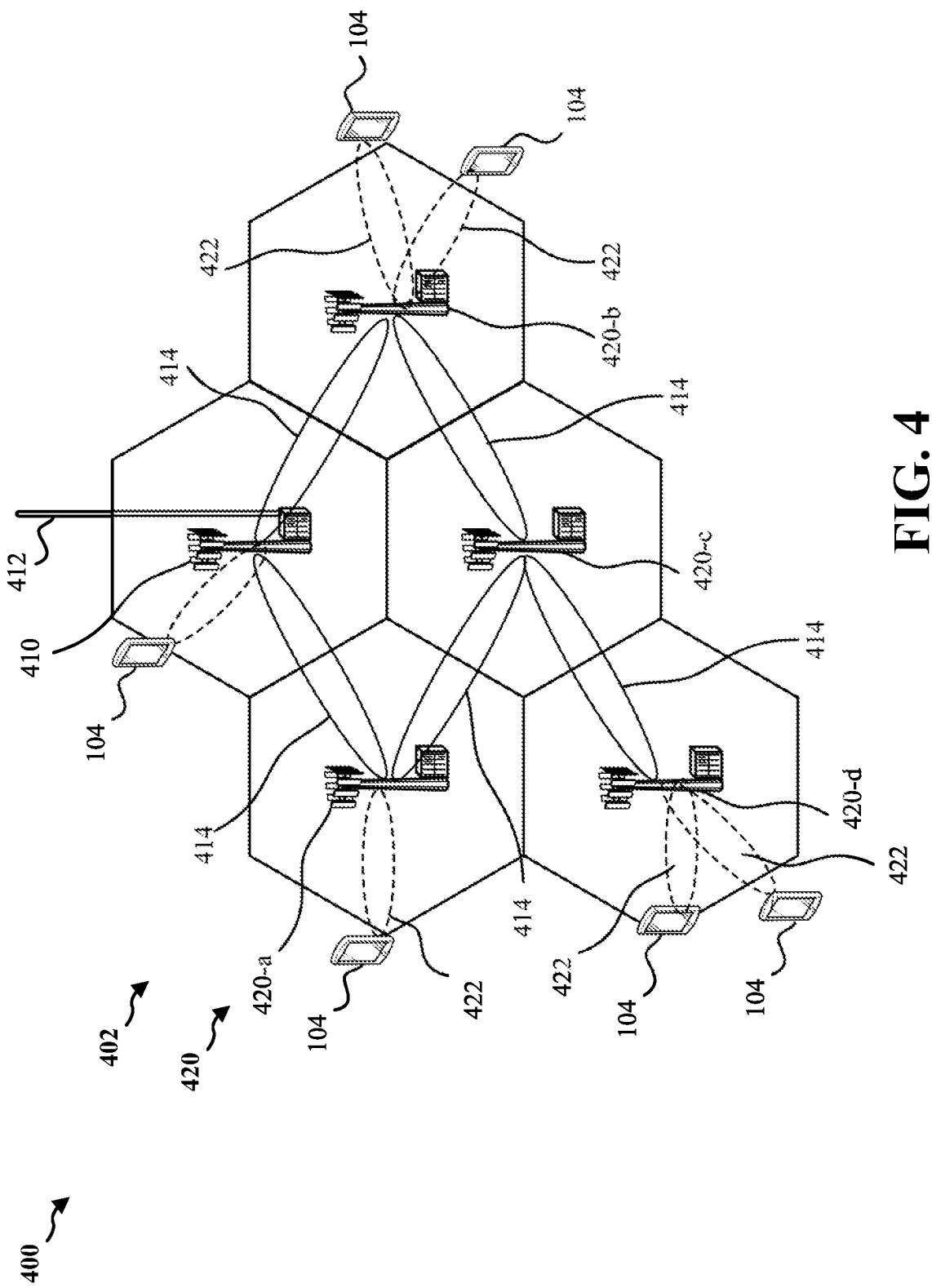
FIG. 4 is a diagram of an example integrated access and backhaul (IAB) network topology.

Referring to FIG. 4, an example of a network topology 400 for a wireless backhaul network 402 such as an IAB network that includes a donor node 410 and several relay nodes 420 providing access to UEs 104. Wireless backhauls 414 can provide range extension to a wireline backhaul 412 or fronthaul. A wireless backhaul network 402 may support multiple backhaul hops as well as redundant connectivity, e.g. by providing multiple paths between a donor node 410 (e.g., a CU) and a relay node 420 (e.g., one of relay nodes 420-a, 420-b, 420-c, or 420-d acting as a parent IAB node 310 and/or a child IAB node 350). In this context, the donor node 410 provides the interface between the wireless network and the wireline network (e.g., 5G core network 190 (FIG. 1)).

In an IAB network, the donor node 410 may act as a CU, and each of the relay nodes 420 may act as a distributed unit (DU). Each of the relay nodes 420 may be referred to as an IAB node. Each IAB node may include a mobile terminal (MT) portion (IAB-MT) that communicates with a parent node and a DU portion (IAB-DU) that communicates with a child node. A network topology 400 may include one or more parent nodes and one or more child nodes for each IAB node that define a location within the network topology 400. For example, a first relay node 420 may be a parent node to second relay node 420 and a child node to a third relay node 420. Child nodes may include UEs 104, which may be connected to a parent IAB node via an access link 422. For example, the location for the relay node 420-b may include the donor node 410 as a parent node, the relay node 420-c as a child node, and the UEs 104 as child nodes. As another example, the relay node 420-c may have two parent nodes, relay nodes 420-a and 420-b, and one child node 420-d.

Figure 5:
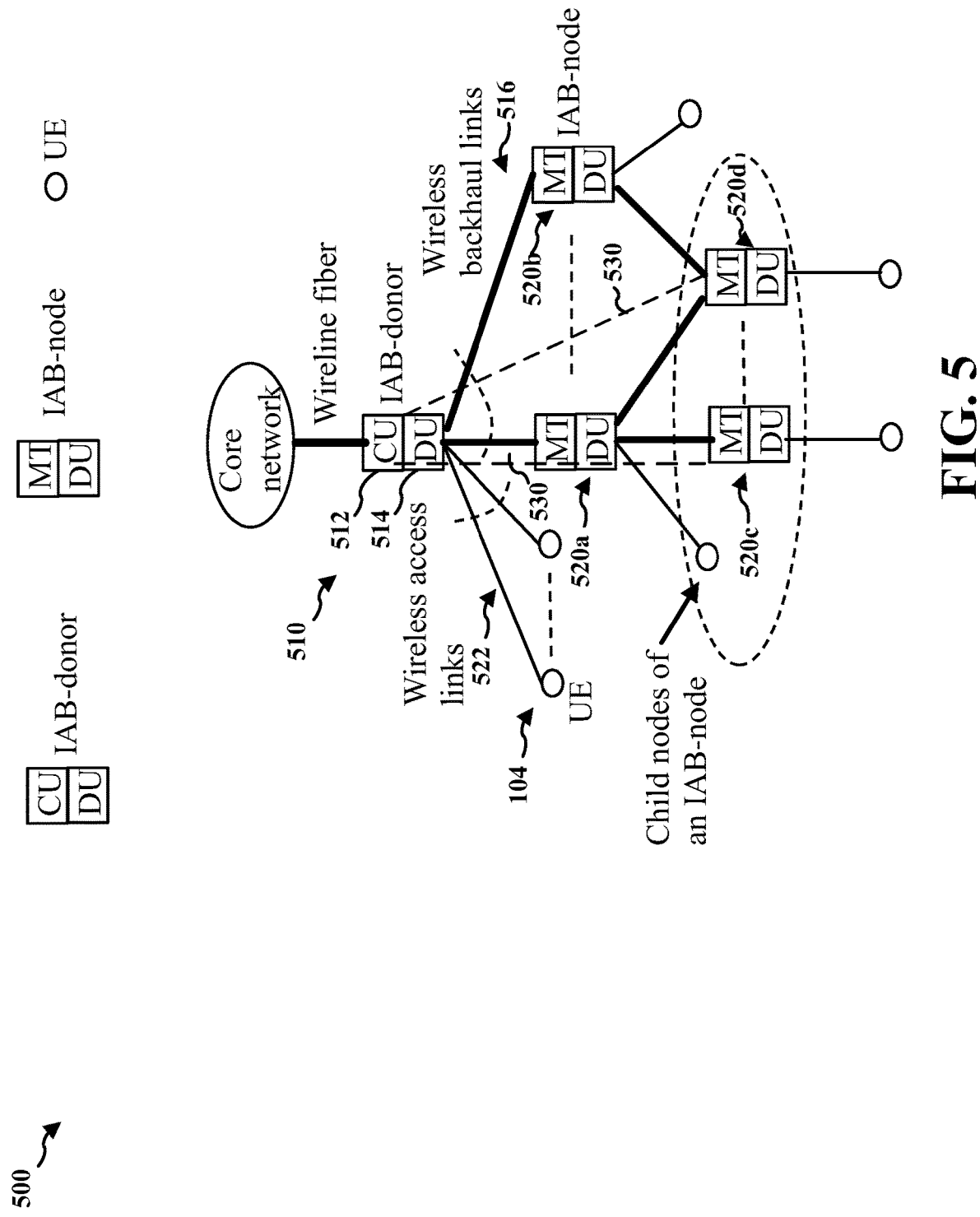
FIG. 5 is a diagram of an example timing diagram for synchronization between a parent IAB node and a child IAB node based on a cell-specific component of a timing difference.

FIG. 5 is a diagram 500 illustrating an example of an IAB network with an IAB-donor 510 and multiple IAB-nodes 520 (e.g., 520a, 520b, 520c, and 520d). The IAB-donor 510 may be an enhanced gNB node with functions to control the IAB network. The IAB-donor 510 may include a CU 512 that controls the whole IAB-network through configuration. The IAB-donor 510 may include a distributed unit (DU) 514 as a scheduling node that schedules child nodes (e.g., IAB-nodes 520a and 520b) of the IAB-donor 510. The IAB-nodes 520 may include a MT function that performs as a scheduled node similar to a UE scheduled by the IAB-donor 510 or a parent IAB-node. The IAB-nodes 520 may include a DU that schedules child IAB-nodes and UEs. The IAB nodes 520 may be connected to the IAB-donor 510 via another IAB node 520. For example, the IAB-node 520c may be connected via the IAB-node 520a. As another example, the IAB-node 520d may be connected to the IAB-donor 510 via multiple IAB-nodes 520a and 520b. The connection between an IAB-node 520 and the IAB-donor CU 512 may be referred to as an F1-connection 530.

Traffic for multiple UEs 104 or services may be multiplexed over the backhaul connections 516. When an IAB-node 512 has multiple backhaul connections 516, communications may be routed at the backhaul adaptation protocol (BAP) layer based on a routing identifier (ID). Each child IAB-node may route traffic toward the IAB-donor 510 based on the routing ID. Further, traffic may be prioritized based on the selected RLC channel. The routing ID and RLC channel may be selected upon entry to the IAB network (e.g., at the serving IAB-node 520 for uplink traffic and the serving IAB-donor DU 514 for downlink traffic). Additionally, multiple UEs 104 may be connected to a respective IAB-node 512 via wireless access links 522. The wireless access links 522 may also one or more multiple RLC channels.

Figure 6:
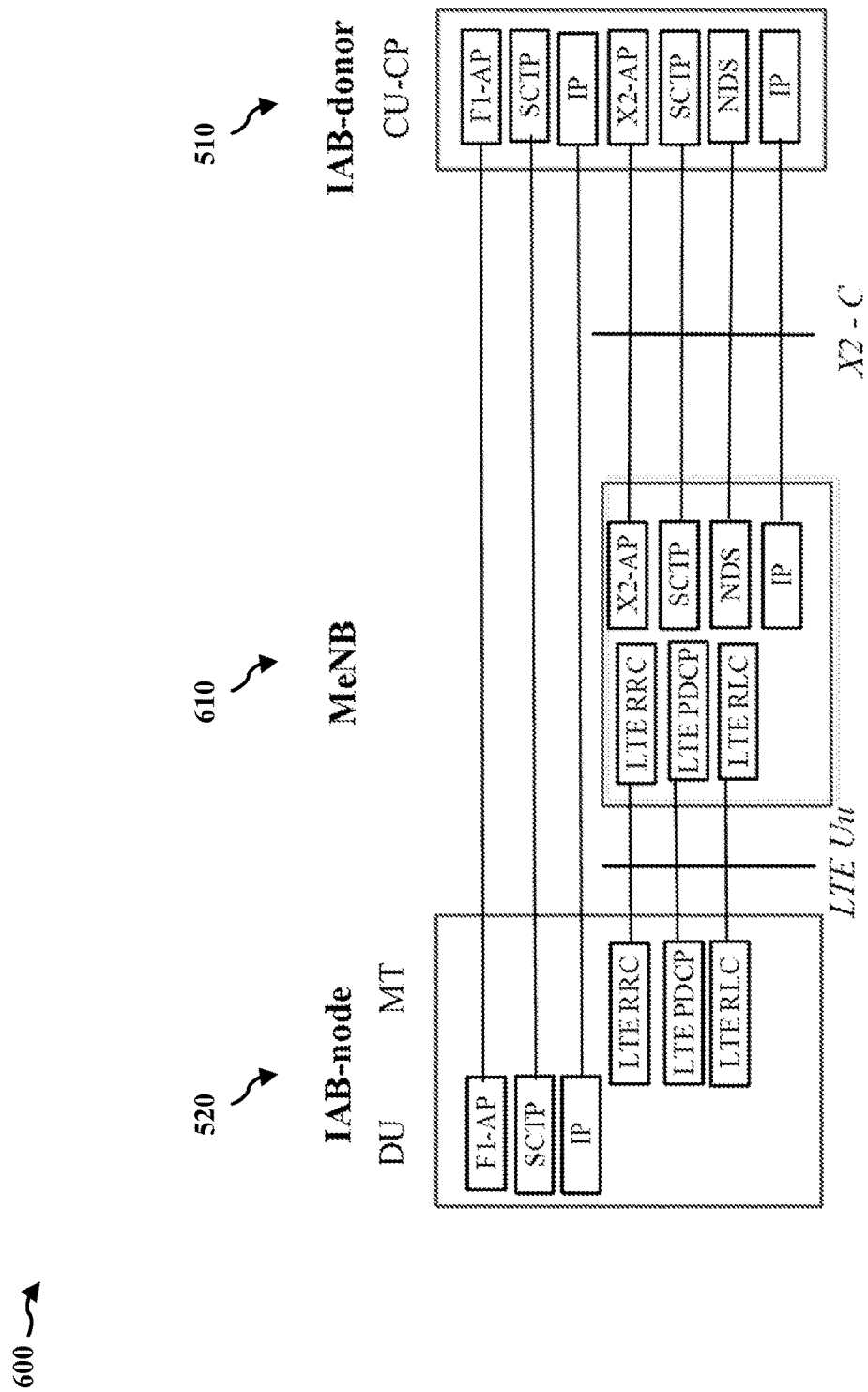
FIG. 6 is a diagram illustrating an example of a protocol stack encapsulating traffic.

FIG. 6 is a diagram 600 illustrating an example of a protocol stack encapsulating traffic. For example, in an aspect that may be used for E-UTRAN New Radio-Dual Connectivity (ENDC), a master cell group (MCG) may utilize a first radio access technology (RAT) (e.g., LTE) and the secondary cell group (SCG) may utilize a second RAT (e.g., 5G NR). For an IAB-node 520 employing ENDC, an alternative F1-C path for control plane traffic between the IAB-node 520 and the IAB-donor 510 may be established via LTE RRC and X2 AP. That is, F1-C traffic may be carried in IP packets encapsulated within LTE RRC messages between the IAB-node and a master eNB (MeNB) 610. The IP packets may then be carried from the MeNB 610 to the IAB-donor via a wired connection. The F1-C traffic may be control signaling for the backhaul between the IAB-node and IAB-donor.

Figure 7:
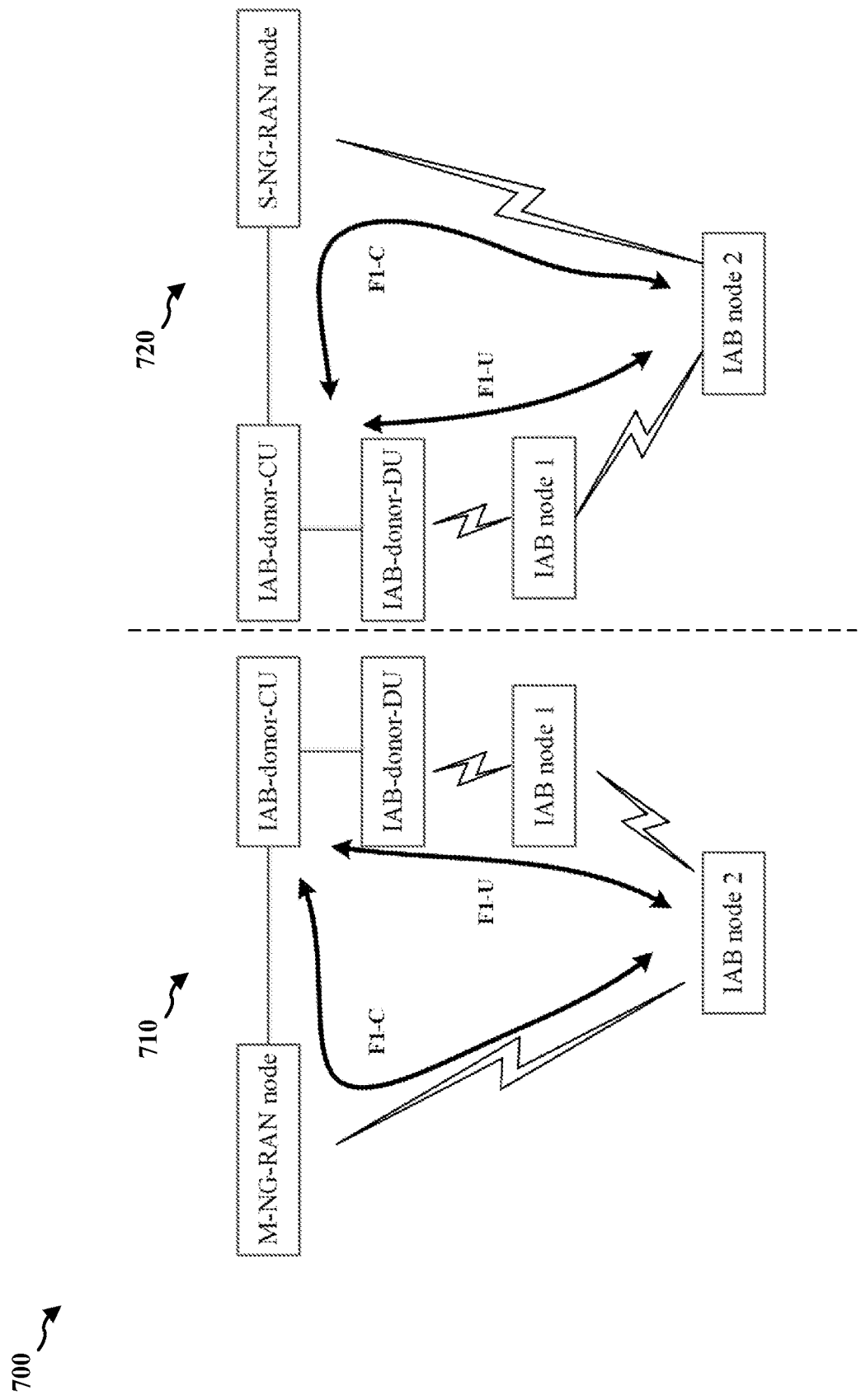
FIG. 7 is a diagram illustrating another example of F1-C traffic carried over another connection.

FIG. 7 is a diagram 700 illustrating another example of F1-C traffic carried over another connection. 3GPP Rel-17 eIAB supports two scenarios for CP-UP separation In a first scenario 710, F1-C uses an NR access link via a M-NG-RAN node (non-donor node) and F1-U uses a backhaul link via S-NG-RAN node (donor node). In the second scenario 720, F1-U uses a backhaul link via the M-NG-RAN node (donor node) and F1-C uses an NR access link via the S-NG-RAN node (non-donor node). In the first scenario 710, signaling radio bearer 2 (SRB2) can be used for F1-C transport. In the second scenario 720, a split SRB2 can be used for F1-C transport. Accordingly, F1-C traffic may be carried as RRC signaling over SRB2.

Figure 8:
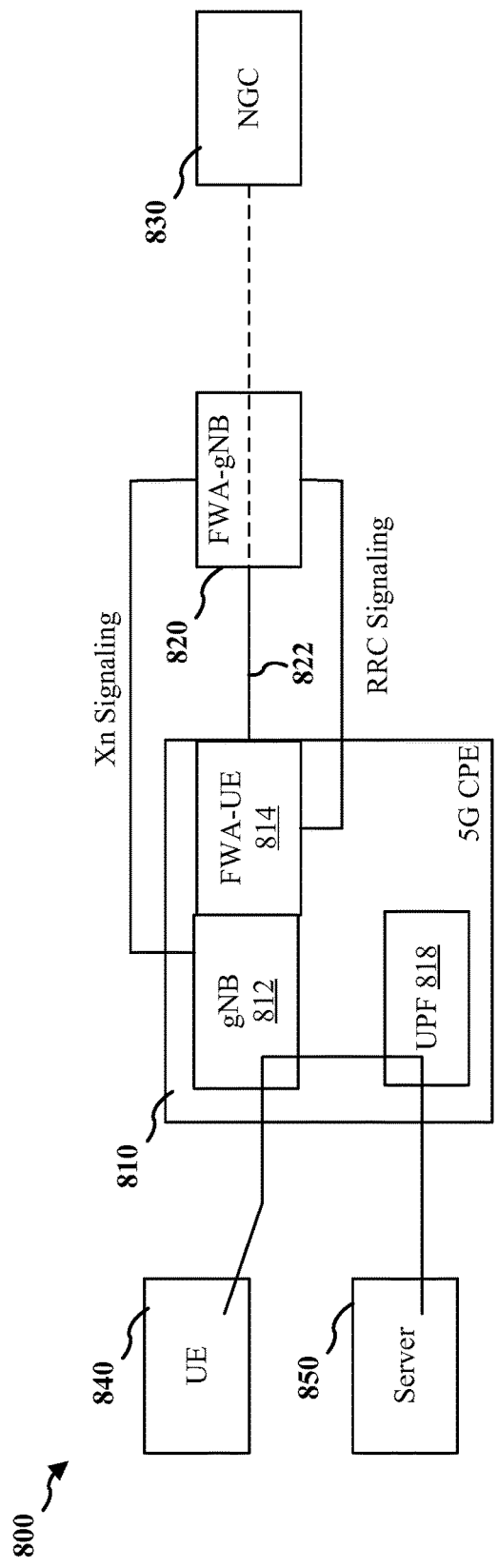
FIG. 8 is a diagram of a first example architecture for consumer premises equipment (CPE) with fixed wireless access (FWA).

FIG. 8 is a diagram of a first example architecture 800 for CPE with fixed wireless access (FWA). The architecture 800 may be arranged as back to back UEs and gNBs. As illustrated, the CPE 810 may include a serving gNB 812 for local UEs 840 and a FWA UE 814 served by a FWA-gNB 820. The wireless connection 822 between the FWA-UE 814 and the FWA-gNB may include an RRC connection that carries RRC signaling. The FWA-gNB 820 may be connected to the NGC 830 via a wired or wireless backhaul.

The CPE 810 may provide connectivity for the UE 840 and other devices such as a server 850 via control plane signaling. For example, the gNB 812 and the FWA-gNB 820 may provide the UEs 840 with in-band multiplexing of radio resources. That is, the gNB 812 and the FWA-gNB 820 may operate on the same band and coordinate allocation of radio resources. Further, the gNB 812 and the FWA-gNB 820 may support mobility of the UE 840, for example, when the UE 840 moves from indoors to outdoors or vice versa. The gNB 812 and the FWA-gNB 820 may communicate via Xn signaling. In some implementations utilizing LTE signaling, the Xn signaling may be an X2 interface. In some implementations, the CPE 810 may include a local UPF function 818 that may be configured by the NGC 830 via N4 signaling.

In an aspect, the RRC signaling for the wireless connection 822 between the FWA-UE 814 and the FWA-gNB 820 may be used to carry the Xn/X2 signaling between the gNB 812 and the FWA-gNB 820. For instance, the FWA-UE 814 may encapsulate Xn signaling into RRC messages for transmission to the FWA-gNB 820. The FWA-gNB 820 may decapsulate the Xn signaling from the RRC messages. Similarly, the FWA-gNB 820 may encapsulate Xn signaling into RRC messages and the FWA-UE 814 may decapsulate the Xn signaling from the RRC messages. Accordingly, the wireless connection 822 may transport Xn signaling between base stations to support RAN management of local traffic between the gNB 812 and the UEs 840.

Figure 9:
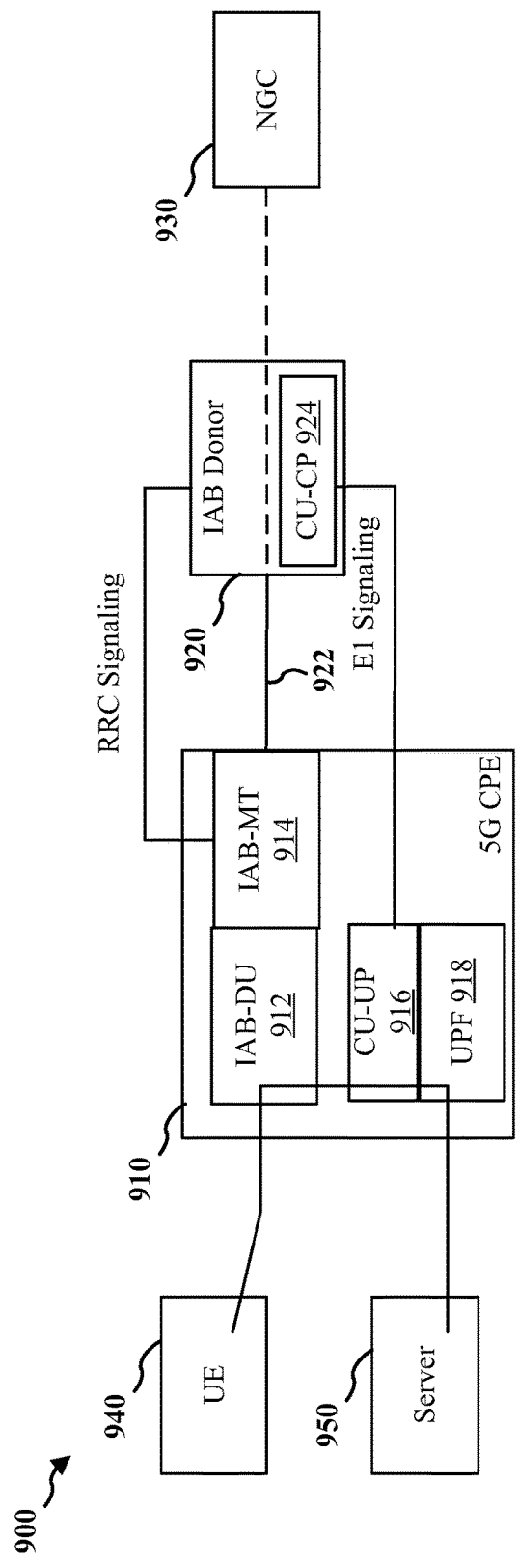
FIG. 9 is a diagram of a second example architecture for CPE with native IAB.

FIG. 9 is a diagram of a second example architecture 900 for CPE with native IAB. The architecture 900 may be arranged with the CPE 910 including an IAB-node having an IAB-DU 912 and an IAB-MT 914. The CPE 910 may be a child IAB-node of an IAB donor 920. As discussed above with respect to FIG. 5, the wireless connection 922 may include zero or more intermediate IAB-nodes. The wireless connection 922 between the IAB-MT 914 and the IAB-donor 920 may include an RRC connection that carries RRC signaling. The IAB-Donor 920 may be connected to the NGC 930 via a wired backhaul.

Similar to the first example architecture 800, the second example architecture 900 may support RAN management of local traffic. In a local breakout scenario, a UE 940 may communicate with a server 950 (e.g., a printer) located in the home. Generally, IP packets from the UE 940 would be routed to the NGC 930 and then back to the server 950. Local breakout may allow the CPE 910 to route the traffic from the UE 940 directly to the server 950. For local breakout, a base station may be divided into a logical node hosting a control plane (CP) part (e.g., CU-CP 924) of a packet data convergence protocol (PDCP) of the base station and one or more logical nodes hosting a user plane (UP) part of the PDCP protocol of the base station (e.g., CU-UP 916). The CPE 910 may include the local CU-UP 916 to terminate local traffic. The CU-CP 924 may be located at the IAB-donor 920 and communicate with the local CU-UP UPF 918 via E1 signaling. In some implementations utilizing LTE signaling, the E1 signaling may be a W1 interface. Additionally, a UPF function 918 of the local CU-UP 916 may be configured by the NGC 930 via N4 signaling.

In an aspect, RRC signaling for the wireless connection 922 between the IAB-MT 914 and the IAB-donor 920 may be used to carry the E1/W1 signaling between the IAB-MT 914 and the IAB-donor 920. For instance, the IAB-MT 914 may encapsulate E1 signaling into RRC messages for transmission to the IAB donor 920. The IAB donor 920 may decapsulate the E1 signaling from the RRC messages. Similarly, the IAB donor 920 may encapsulate E1 signaling into RRC messages and the IAB-MT 914 may decapsulate the E1 signaling from the RRC messages. Accordingly, the wireless connection 922 may transport E1 signaling between the CPE 910 and the IAB-donor 920 to support RAN management of local traffic between the IAB-DU 910 and the UE 940 and/or server 950.

Figure 10:
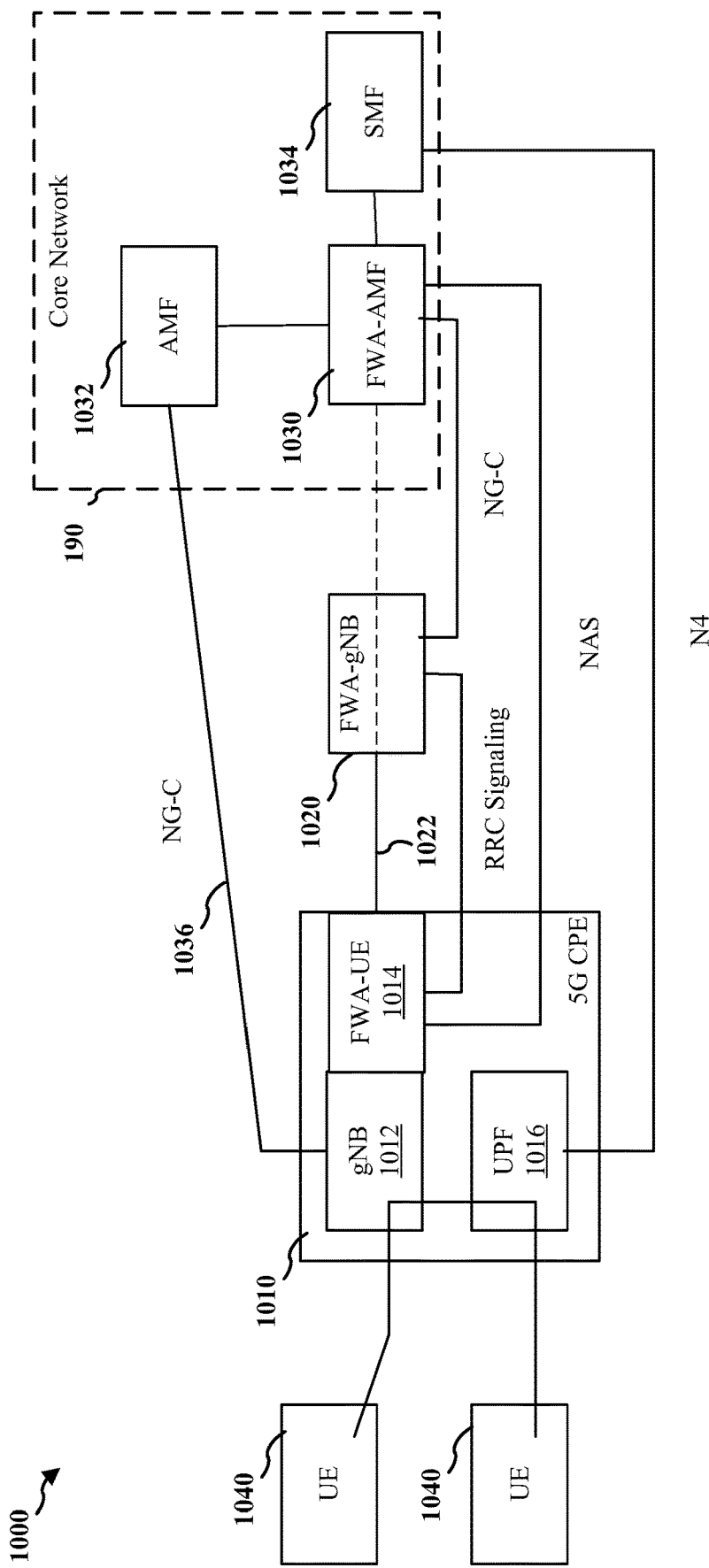
FIG. 10 is a diagram of a third example architecture for a CPE with FWA and multiple core network nodes.

FIG. 10 is a diagram of a third example architecture 1000 for a CPE 1010 with FWA and multiple core network nodes. For example, as illustrated, the CPE 1010 may include a FWA-UE 1014 connected with a core network 190 for the CPE 1010 via a FWA connection 1022. The FWA connection 1022 may be implemented via a macro base station such as FWA-gNB 1020. The CPE 1010 may include a gNB 1012 that serves one or more UEs 1040. The gNB 1012 may be interconnected to the core network 190 via a NG-C connection 1036, which may use the RRC connection or the NAS connection of the FWA-UE 1014. The UEs 1040 may be connected to the core network 190 via the CPE 1010.

Similar to the first example architecture 800, the third example architecture 1000 may support RAN management of local traffic. For example, the UE 1040 may perform NAS signaling with an AMF 1032. The AMF 1032 may be in a core network 190 of a RAN for the UE 1040, which may be the same or different than the RAN for the FWA-UE 1014. To setup the NG-C connection 1036 (or NGAP) for the gNB 1012, the NAS connection of FWA-UE 1014 (or the RRC connection of UE 1014 and NG-C/NGAP of gNB 1020) may carry signaling. For example, signaling at lower protocols in the stack may be used to setup a protocol higher in the stack. Signaling at lower protocols in the stack may also be used to maintain a protocol higher in the stack. This lower layer signaling associated with the second signaling connection may also be traffic carried in the first signaling connection, whether this lower layer signaling is part of setting up or maintaining the second signaling connection. In some implementations utilizing LTE signaling, the NG connection may be an S1 interface. Additionally, in order to implement local breakout in the architecture 1000, the CPE 1010 may include a UPF 1016, which may be configured by a core network node such as the SMF 1034 via N4 signaling. In some implementations utilizing LTE signaling, the N4 signaling may be an Sx interface. Accordingly, the NG-C and N4 signaling may provide management of local traffic between the gNB 1012 and the UE 1040. The NG-C and N4 signaling may require transport from the CPE 1010 to the core network In an aspect, NG-C and/or N4 signaling may be transported over RRC signaling for the wireless connection 1022 between the FWA-gNB 1014 and the FWA-gNB 1020 and over an NG-C connection between the FWA-gNB 1020 and FWA-AMF 1030. For instance, the FWA-UE 1014 may encapsulate NG-C signaling for the AMF 1032 or N4 signaling for the SMF 1034 into RRC messages for transmission to the FWA-gNB 1020. The FWA-gNB 1020 may decapsulate the NG-C signaling or NF signaling from the RRC messages. The FWA-gNB 1020 may then encapsulate the NG-C signaling for the AMF 1032 or N4 signaling for the SMF 1034 within NG-C signaling for the FWA-AMF 1030. The FWA-AMF 1030 may decapsulate the NG-C signaling for the AMF 1032 or N4 signaling for the SMF 1034 from the NG-C signaling and forward the NG-C or N4 signaling to the appropriate core network node. Similarly, the signaling for NG-C or N4 may operate in reverse with the FWA-AMF 1030 encapsulating the signaling. The FWA-gNB 1020 may decapsulate the signaling from the NG-C signaling and re-encapsulate the signaling into RRC messages. The FWA-UE 1014 may decapsulate the signaling from the RRC messages. In some implementations, encapsulation within NAS signaling of FWA-UE 1014 may be used instead of RRC. The NAS signaling may still use the RRC signaling of UE 1014 and NG-C signaling of gNB 1020. The NAS signaling would be carried as a transparent container. Therefore, there are two transport solutions for encapsulating NG-C signaling: RRC or NAS (which uses RRC transparently).

Figure 11:
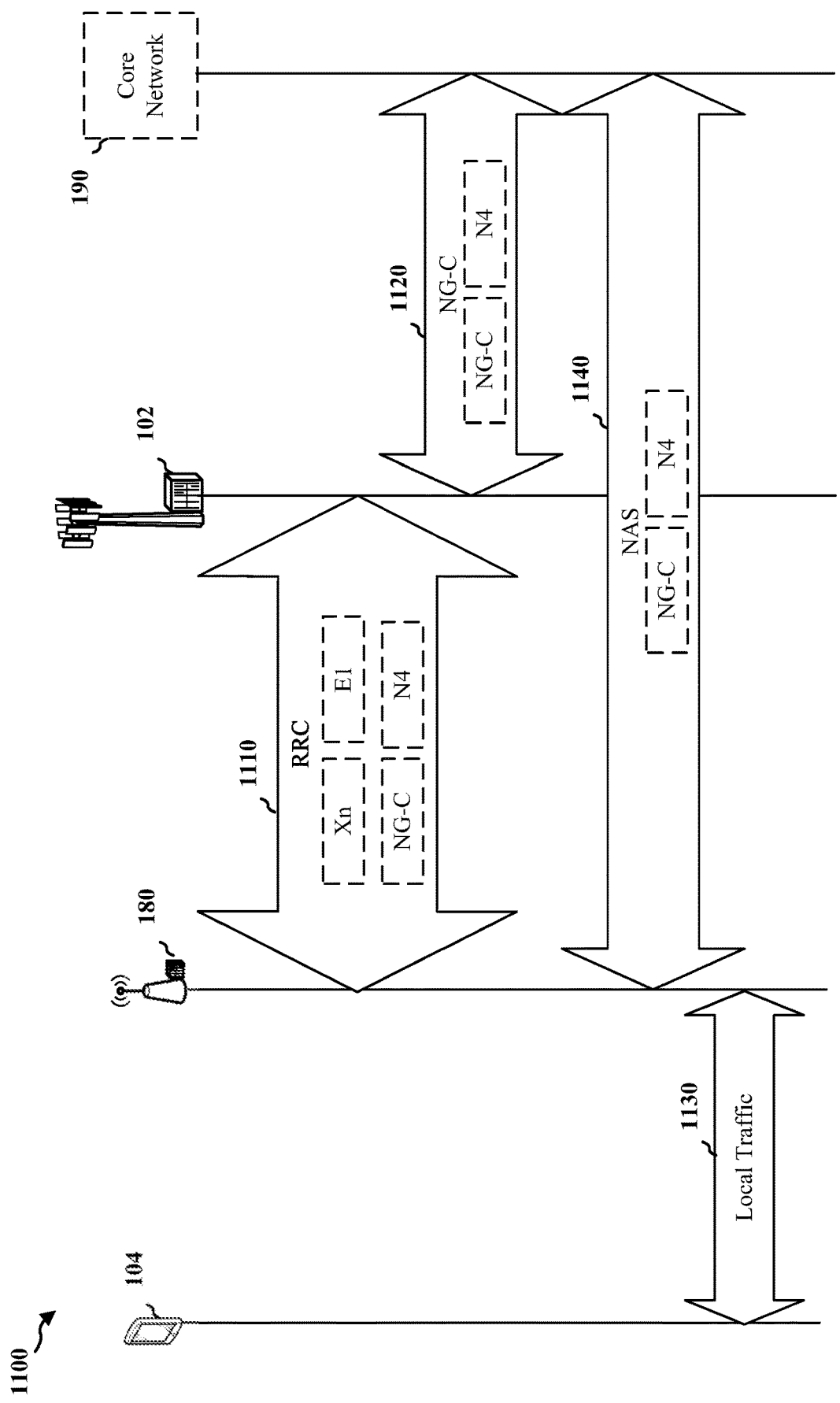
FIG. 11 is a diagram illustrating example communications between a UE, a CPE, a base station, and a core network.

FIG. 11 is a diagram 1100 illustrating example communications between a UE 104, a CPE 180, a base station 102, and a core network 190. The CPE 180 may be a CPE in an architecture 800, 900, 1000 such as CPE 810, 910, or 1010. The base station 102 may be, for example, an FWA-gNB 820, 1020 or an IAB donor 920. The core network 190 may correspond to the NGC 830 or 930. The core network 190 may include the FWA-AMF 1030, the AMF 1032, and/or the SMF 1034.

The CPE 180 and the base station 102 may establish a first wireless signaling connection such as an RRC connection 1110. The CPE 180 may establish a second signaling connection for coordinating management of a RAN for local traffic 1130 between the CPE 180 and the UE 104. For example, the second signaling connection may be one of Xn, E1, NG-C, or N4. The CPE 180 and/or the base station 102 may encapsulate or decapsulate the traffic associated with the second wireless signaling connection within the first wireless signaling connection (e.g., RRC connection 1110). For example, the CPE 180 and/or base station 102 may encapsulate the traffic for the second signaling connection in an RRC information transfer message such as DL information transfer or an UL information transfer. The other node of the CPE 180 and/or the base station 102 may decapsulate the traffic for the second signaling connection from the RRC information transfer message.

For signaling between the CPE 180 and the core network 190, the base station 102 or a node in the core network 190 may encapsulate the traffic for the second signaling connection within a third signaling connection such as an NG-C connection 1120. For example, the base station 102 may encapsulate NG-C traffic for the AMF-1032 or NF traffic for the SMF 1034 within the NG-C connection 1120 with the FWA-AMF 1030. Accordingly, traffic for the second signaling connection for RAN management of local traffic 1130 may be carried between the CPE 180 and another base station 102 or the core network 190.

In another implementation, the signaling between the CPE 180 and the core network 190 (e.g., NG-C or N4 signaling) may be encapsulated in NAS signaling 1140. The NAS signaling 1140 may extend between the CPE 180 and an AMF within the core network 190. The AMF may decapsulate the encapsulated signaling, and either process the signaling or forward the signaling to another node (e.g., another AMF or a SMF).

Figure 12:
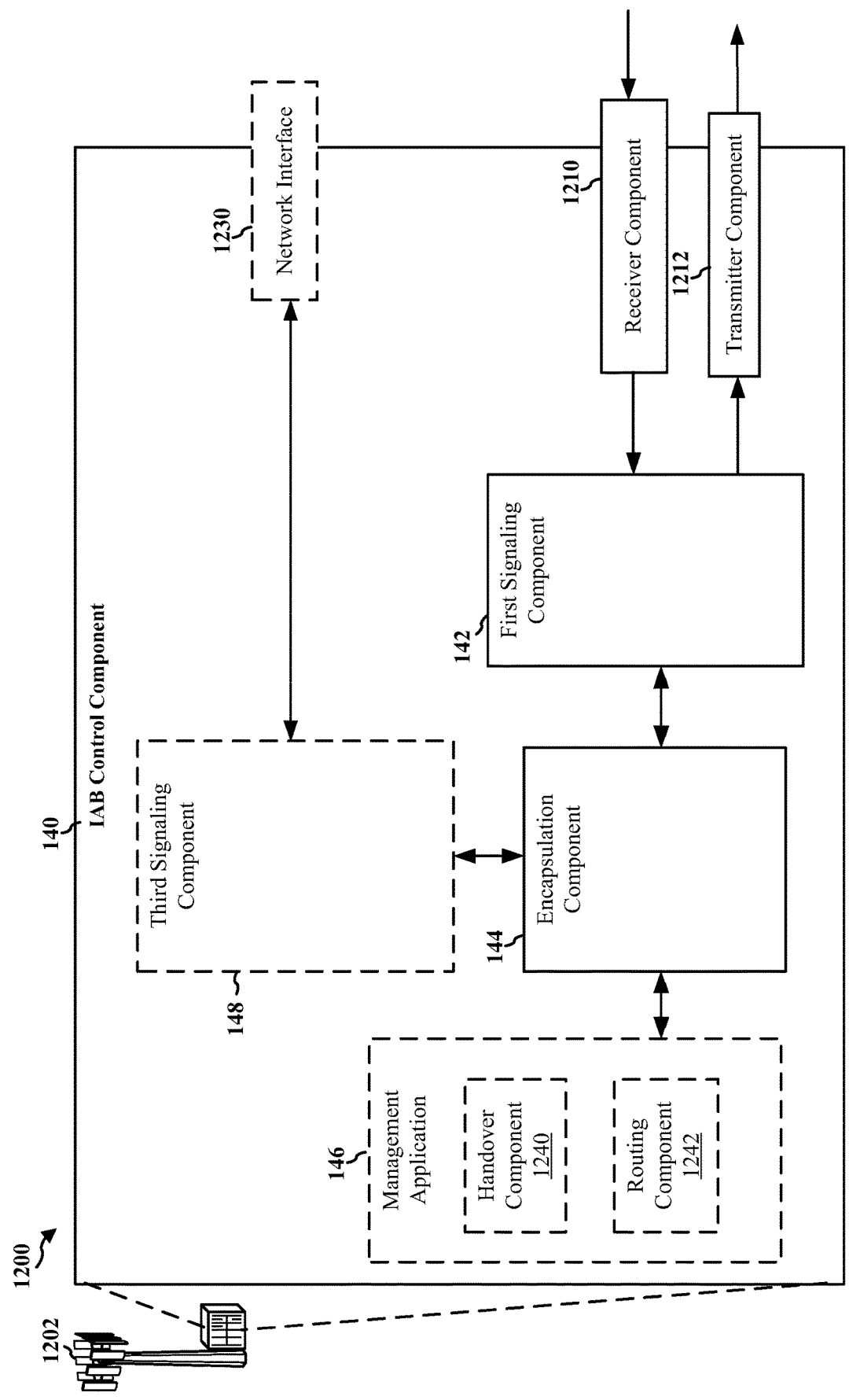
FIG. 12 is a conceptual data flow diagram illustrating the data flow between different means/components in an example network node.

FIG. 12 is a conceptual data flow diagram 1200 illustrating the data flow between different means/components in an example network node 1202, which may be an example of the base station 102, the CPE 180, or a node within core network 190 such as AMF 192 or SMF 194. The network node 1202 includes a local traffic management component 140.

The network node 1202 may include a receiver component 1210, which may include, for example, a radio frequency (RF) receiver for receiving the signals described herein. The network node 1202 may include a transmitter component 1212, which may include, for example, an RF transmitter for transmitting the signals described herein. In an aspect, the receiver component 1210 and the transmitter component 1212 may be co-located in a transceiver such as illustrated by the TX/RX 318 in FIG. 3.

As discussed above regarding FIG. 1, the local traffic management component 140 may include first signaling component 142 and an encapsulation component 144. In some implementations, the local traffic management component 140 may include a management application 146 and/or a third signaling component 148.

The receiver component 1210 may receive signals over a wireless connection. For example, the receiver component 1210 may receive signals over wireless connection 822, 922, or 1022. In an aspect, the signals may be a message for a first signaling connection (e.g., RRC). The receiver component 1210 may pass received messages to the first signaling component 142.

The first signaling component 142 may be configured to establish a first wireless signaling connection between a first node and a second node. For example, the first wireless signaling connection may be an RRC connection. The first signaling component 142 may establish an RRC connection between the first node (e.g., CPE 180) and the second node (e.g., a base station 102). For example, the first signaling component 142 may execute a random access procedure to establish the RRC connection procedure. In some implementations, the first node is a FWA-UE 814 or IAB-MT 914 that provides the RAN for the UE and the second node is a base station (e.g., FWA-gNB 820 or IAB donor 920) that serves the first node. In another example, the first node is a FWA-UE 814 or IAB-MT 914 that provides the RAN for the UE and the second node is an AMF 1030 for the first node. The first signaling connection may be a NAS connection between the FWA-UE 814 and the AMF 1030. The first signaling component 142 may provide messages for the first signaling connection to the transmitter component 1212 for transmission over the wireless connection 822, 922, or 1022.

The local traffic management component 140 may optionally include a management application 146. The management application 146 may be associated with a second signaling connection. For example, the management application 146 may manage local traffic by communicating over the second signaling connection. For example, the management application 146 may generate or receive traffic according to an Xn interface, E1 interface, NG-C interface, or N4 interface. In some implementations, traffic associated with the second wireless signaling connection includes traffic to establish the second wireless signaling connection. In some implementations, the traffic associated with the second wireless signaling connection includes traffic of a transport layer protocol or a network layer protocol of the second wireless signaling connection. In some implementations, the traffic associated with the second wireless signaling connection includes traffic of a control protocol or application protocol of the second wireless signaling connection. In some implementations, the management application 146 may optionally include a handover component 1240 configured to hand over the UE 840 from the base station co-located with the first node (e.g., gNB 812) to the serving base station of the first node (e.g., FWA-gNB 820). For example, the traffic associated with the second signaling connection may be a handover command over the Xn interface. In some implementations, the management application 146 may include a routing component 1242 configured to route local breakout traffic from the UE to another local device at the first node. For example, the routing may be configured by the traffic associated with the second wireless signaling connection. The management application 146 may receive signaling from the encapsulation component 144 and provide signaling to the encapsulation component 144.

The encapsulation component 144 may be configured to encapsulate or decapsulate traffic associated with a second wireless signaling connection within the first wireless signaling connection. For example, the encapsulation component 144 may receive traffic for the second wireless signaling connection from the management application 146 and encapsulate the traffic in a message for the first wireless signaling connection. The encapsulation component 144 may then provide the message to the first signaling component 142 for transmission. Conversely, the encapsulation component 144 may receive message for the first signaling connection encapsulating traffic for the second signaling connection. The encapsulation component 144 may decapsulate the traffic for the second signaling connection and provide the decapsulated traffic to the management application 146.

In some implementations, the encapsulation component 144 may be configured to forward traffic of the second signaling connection to or from a third node. For example, the encapsulation component 144 may forward decapsulated traffic to the third signaling component 148 (e.g., when the management application 146 is located at a different node) or receive traffic from the third signaling component 148. In some implementations, the encapsulation component 144 may encapsulate or decapsulate the traffic associated with the second wireless signaling connection within a third signaling connection between an FWA-gNB and an FWA-AMF. For example, the encapsulation component 144 may encapsulate the decapsulated traffic for the second signaling connection in an NG-C message before forwarding to the third signaling component 148.

The local traffic management component 140 may optionally include the third signaling component 148. The third signaling component 148 may be configured to transmit and receive traffic according to a third signaling connection. For example, the third signaling component 148 may receive traffic from the encapsulation component 144 and forward the traffic to a network interface 1230. Conversely, the third signaling component 148 may receive traffic from the network interface 1230 and forward the traffic to the encapsulation component 144.

The network interface 1230 may be an interface to a network connection. For example, the network interface 1230 may be an interface to an Ethernet or fiber connection.

Figure 13:
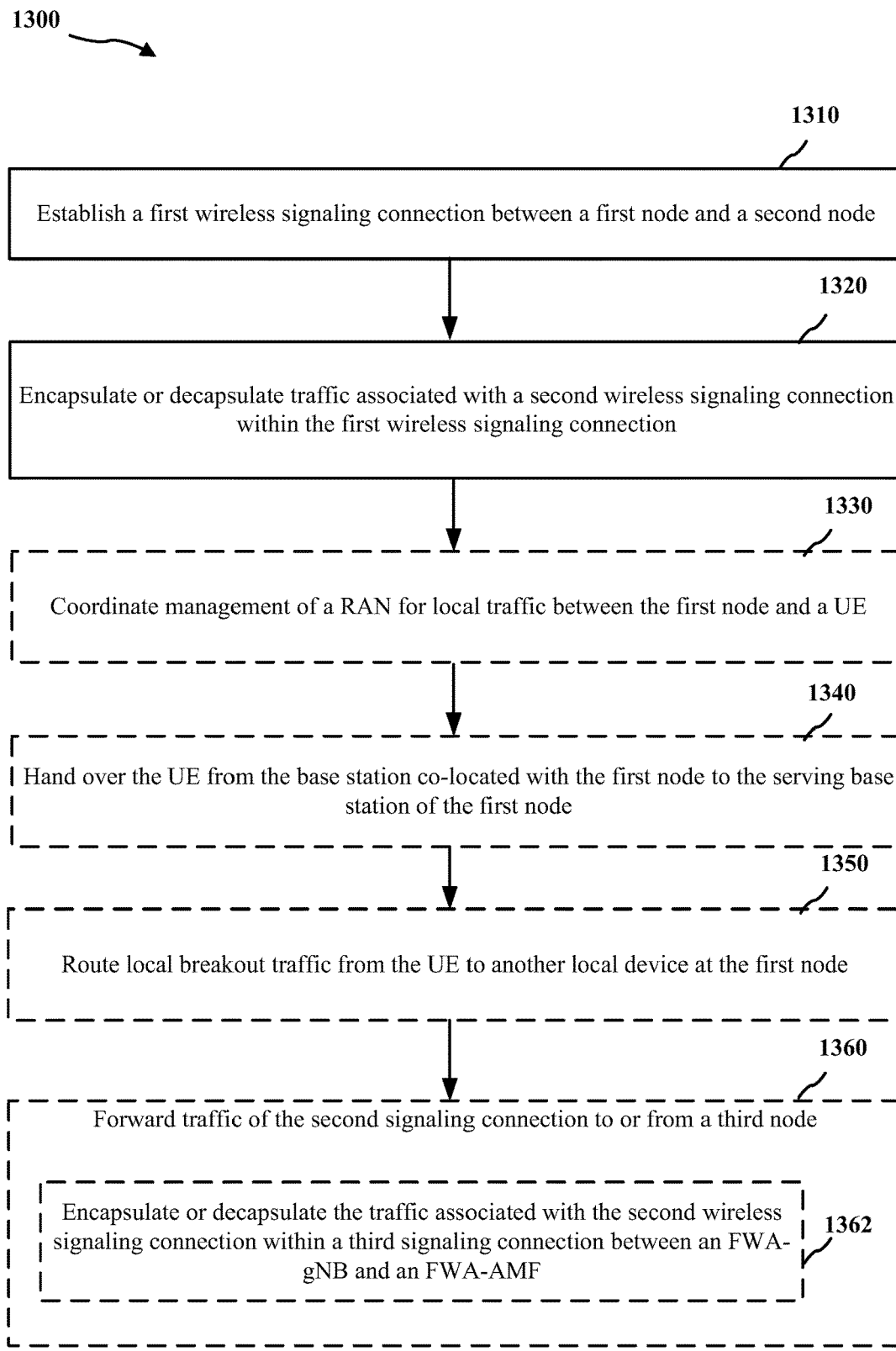
FIG. 13 is a flowchart of an example method for transport of signaling used to coordinate management of a RAN for local traffic between a first node and a UE.

FIG. 13 is a flowchart of an example method 1300 for transport of signaling used to coordinate management of a RAN for local traffic between a first node and a UE. The method 1300 may be performed by a network node 1202, which may be an example of the base station 102, the CPE 180, or a node within core network 190 such as AMF 192 or SMF 194. The network node 1202 may include memory 360 and which may be the entire network node 1202 or a component of the network node 1202 such as the local traffic management component 140, TX processor 368, the RX processor 356, or the controller/processor 359. The method 1300 may be performed by the traffic management component 140 in communication with a traffic management component 140 of another network node 1202.

At block 1310, the method 1300 may include establishing a first wireless signaling connection between a first node and a second node. In an aspect, for example, the network node 1202, the TX processor 368, the RX processor 356, or the controller/processor 359 may execute the local traffic management component 140 and/or the first signaling component 142 to establish a first wireless signaling connection between a first node and a second node. In some implementations, the first node is a FWA-UE 814 or IAB-MT 914 that provides the RAN for the UE 840, 940 and the second node is a base station (e.g., FWA-gNB 820 or IAB donor 920) that serves the first node. In such implementations, the first wireless signaling connection may be an RRC connection. In some implementations, the is a FWA-UE 814 or IAB-MT 914 that provides the RAN for the UE 840, 940 and the second node is an AMF 1030 for the first node. In such implementations, the first signaling connection may be a non-access stratum (NAS) connection. Accordingly, the network node 1202, the TX processor 368, the RX processor 356, or the controller/processor 359 executing the local traffic management component 140 and/or the first signaling component 142 may provide means for establishing a first wireless signaling connection between a first node and a second node.

At block 1320, the method 1300 may include encapsulating or decapsulating traffic associated with a second wireless signaling connection within the first wireless signaling connection. In an aspect, for example, the network node 1202, the TX processor 368, the RX processor 356, or the controller/processor 359 may execute the local traffic management component 140 and/or the encapsulation component 144 to encapsulate or decapsulate traffic associated with a second wireless signaling connection within the first wireless signaling connection. The second wireless signaling connection may correspond to a non-F1 interface of a control plane or user plane network function that terminates at the first node. In some implementations, the traffic associated with the second wireless signaling connection includes traffic to establish the second wireless signaling connection. In some implementations, the traffic associated with the second wireless signaling connection includes traffic of a transport layer protocol or a network layer protocol of the second wireless signaling connection. In some implementations, the second wireless signaling connection includes traffic of a control protocol or application protocol of the second wireless signaling connection. Accordingly, the network node 1202, the TX processor 368, the RX processor 356, or the controller/processor 359 executing the local traffic management component 140 and/or the encapsulation component 144 may provide means for encapsulating or decapsulating traffic associated with a second wireless signaling connection within the first wireless signaling connection.

At block 1330, the method 1300 may optionally include coordinating management of a RAN for local traffic between the first node and a UE. In an aspect, for example, the network node 1202, the TX processor 368, the RX processor 356, or the controller/processor 359 may execute the local traffic management component 140 and/or the management application 146 to coordinate management of a RAN for local traffic between the first node and a UE. In some implementations, the RAN for local traffic at the first node provides wireless access to the UE and backhaul via the second node. The management application 146 may coordinate the RAN via Xn, E1, NG-C, or N4 signaling, for example. Accordingly, the network node 1202, the TX processor 368, the RX processor 356, or the controller/processor 359 executing the local traffic management component 140 and/or the management application 146 may provide means for coordinating management of a RAN for local traffic between the first node and a UE.

At block 1340, the method 1300 may include handing over the UE from the base station co-located with the first node to the serving base station of the first node. In an aspect, for example, the network node 1202, the TX processor 368, the RX processor 356, or the controller/processor 359 may execute the local traffic management component 140 and/or the handover component 1240 to hand over the UE from the base station co-located with the first node to the serving base station of the first node. Accordingly, the network node 1202, the TX processor 368, the RX processor 356, or the controller/processor 359 executing the local traffic management component 140 and/or the handover component 1240 may provide means for handing over the UE from the base station co-located with the first node to the serving base station of the first node.

At block 1350, the method 1300 may optionally include routing local breakout traffic from the UE to another local device at the first node. In an aspect, for example, the network node 1202, the TX processor 368, the RX processor 356, or the controller/processor 359 may execute the local traffic management component 140 and/or the routing component 1242 to route local breakout traffic from the UE to another local device at the first node. Accordingly, the network node 1202, the TX processor 368, the RX processor 356, or the controller/processor 359 executing the local traffic management component 140 and/or the routing component 1242 may provide means for routing local breakout traffic from the UE to another local device at the first node.

At block 1360, the method 1300 may optionally include forwarding traffic of the second signaling connection to or from a third node. In an aspect, for example, the network node 1202, the TX processor 368, the RX processor 356, or the controller/processor 359 may execute the local traffic management component 140 and/or the third signaling component 148 to forward traffic of the second signaling connection to or from a third node. For example, at sub-block 1362, the block 1360 may optionally include encapsulating or decapsulating the traffic associated with the second wireless signaling connection within a third signaling connection between an FWA-gNB and an FWA-AMF. Accordingly, the network node 1202, the TX processor 368, the RX processor 356, or the controller/processor 359 executing the local traffic management component 140 and/or the third signaling component 148 may provide means for forwarding traffic of the second signaling connection to or from a third node.

Some Further Example Clauses

Implementation examples are described in the following numbered clauses:
1. A method of wireless communication, comprising:
    establishing a first wireless signaling connection between a first node and a second node; and
    encapsulating or decapsulating traffic associated with a second wireless signaling connection within the first wireless signaling connection, wherein the second wireless signaling connection corresponds to a non-F1 interface of a control plane or user plane network function that terminates at the first node.
2. The method of clause 1, wherein the first wireless signaling connection is a radio resource control (RRC) connection.
3. The method of clause 1 or 2, wherein the second wireless signaling connection is used to coordinate management of the network function for local traffic between the first node and a first user equipment (UE), and wherein the first node includes a second UE or an integrated access and backhaul mobile terminal (IAB-MT) that provides the network function for the first UE and the second node is a base station that serves the first node.
4. The method of clause 1 or 2, wherein the second wireless signaling connection is used to coordinate management of the network function for local traffic between the first node and a first user equipment (UE), wherein the first node includes a second UE or an integrated access and backhaul mobile terminal (IAB-MT) that provides the network function for the UE and the second node is an access and mobility management function (AMF) for the first node.
5. The method of clause 4, wherein the first signaling connection is a non-access stratum (NAS) connection.
6. The method of any of clauses 1-5, wherein the traffic associated with the second wireless signaling connection includes traffic to establish the second wireless signaling connection.
7. The method of any of clauses 1-6, wherein the traffic associated with the second wireless signaling connection includes traffic of a transport layer protocol or a network layer protocol of the second wireless signaling connection.
8. The method of any of clauses 1-7, wherein the traffic associated with the second wireless signaling connection includes traffic of a control protocol or application protocol of the second wireless signaling connection.
9. The method of clause 3, wherein the second wireless signaling connection is for signaling procedures between a base station co-located with the first node and a serving base station of the first node.
10. The method of clause 9, further comprising handing over the first UE from the base station co-located with the first node to the serving base station of the first node.
11. The method of clause 3, wherein the second wireless signaling connection is for signaling procedures between a logical node hosting a control plane part of a packet data convergence protocol (PDCP) of a base station and a logical node co-located with the first node hosting a user plane part of the PDCP protocol of the base station.
12. The method of clause 11, further comprising routing local breakout traffic from the first UE to another local device at the first node.
13. The method of clause 4, wherein the second wireless signaling connection is for signaling procedures for an interconnection of a base station co-located with the first node to a core network.
14. The method of any of clauses 1-13, wherein the second wireless signaling connection is for a signaling protocol between a core network control plane function and a user plane function co-located with the first node.
15. The method of any of clauses 1-13, further comprising forwarding traffic of the second signaling connection to or from a third node.
16. The method of clause 15, wherein forwarding the traffic of the second wireless signaling connection to the third node comprises encapsulating or decapsulating the traffic associated with the second wireless signaling connection within a third signaling connection between the second node and an AMF or a session management function (SMF).
17. An apparatus for wireless communication, comprising:
    a memory; and
    at least one processor in communication with the memory and configured to perform the method of any of clause 1-16.
18. An apparatus for wireless communication, comprising means for performing the method of any of clauses 1-16.
19. A non-transitory computer-readable medium storing computer-executable code that when executed by a processor causes the processor to perform the method of any of clauses 1-16.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
   establishing a first wireless signaling connection between a first node and a second node, wherein the first node provides a network function for local traffic between the first node and a first user equipment (UE); and
   encapsulating or decapsulating traffic associated with a second wireless signaling connection within the first wireless signaling connection at the first node, wherein the second wireless signaling connection corresponds to a non-F1 interface of a control plane or user plane network function that terminates at the first node, wherein the second wireless signaling connection is used to coordinate management of the network function for local traffic between the first node and a first user equipment (UE), and wherein the first node includes a second UE or an integrated access and backhaul mobile terminal (IAB-MT) that provides the network function for the first UE.

2. The method of claim 1, wherein the first wireless signaling connection is a radio resource control (RRC) connection.

3. The method of claim 1, wherein the second node is a base station that serves the first node.

4. The method of claim 3, wherein the second wireless signaling connection is for signaling procedures between a base station co-located with the first node and a serving base station of the first node.

5. The method of claim 4, further comprising handing over the first UE from the base station co-located with the first node to the serving base station of the first node.

6. The method of claim 3, wherein the second wireless signaling connection is for signaling procedures between a logical node hosting a control plane part of a packet data convergence protocol (PDCP) of a base station and a logical node co-located with the first node hosting a user plane part of the PDCP protocol of the base station.

7. The method of claim 6, further comprising routing local breakout traffic from the first UE to another local device at the first node.

8. The method of claim 1, wherein the second node is an access and mobility management function (AMF) for the first node.

9. The method of claim 8, wherein the first signaling connection is a non-access stratum (NAS) connection.

10. The method of claim 8, wherein the second wireless signaling connection is for signaling procedures for an interconnection of a base station co-located with the first node to a core network.

11. The method of claim 1, wherein the traffic associated with the second wireless signaling connection includes traffic to establish the second wireless signaling connection.

12. The method of claim 1, wherein the traffic associated with the second wireless signaling connection includes traffic of a transport layer protocol or a network layer protocol of the second wireless signaling connection.

13. The method of claim 1, wherein the traffic associated with the second wireless signaling connection includes traffic of a control protocol or application protocol of the second wireless signaling connection.

14. The method of claim 1, wherein the second wireless signaling connection is for a signaling protocol between a core network control plane function and a user plane function co-located with the first node.

15. The method of claim 1, further comprising forwarding traffic of the second signaling connection to or from a third node.

16. The method of claim 15, wherein forwarding the traffic of the second wireless signaling connection to the third node comprises encapsulating or decapsulating the traffic associated with the second wireless signaling connection within a third signaling connection between the second node and an AMF or a session management function (SMF).

17. An apparatus for wireless communication, comprising:
   a memory; and
   at least one processor in communication with the memory and configured to:
   establish a first wireless signaling connection between a first node and a second node, wherein the first node provides a network function for local traffic between the first node and a first user equipment (UE); and
   encapsulate or decapsulate traffic associated with a second wireless signaling connection within the first wireless signaling connection at the first node, wherein the second wireless signaling connection corresponds to a non-F1 interface of a control plane or user plane network function that terminates at the first node, wherein the second wireless signaling connection is used to coordinate management of the network function for local traffic between the first node and a first user equipment (UE), and wherein the first node includes a second UE or an integrated access and backhaul mobile terminal (IAB-MT) that provides the network function for the first UE.

18. The apparatus of claim 17, wherein the first wireless signaling connection is a radio resource control (RRC) connection.

19. The apparatus of claim 17, wherein the second node is a base station that serves the first node.

20. The apparatus of claim 17, wherein the second node is an access and mobility management function (AMF) for the first node.

21. The apparatus of claim 20, wherein the first signaling connection is a non-access stratum (NAS) connection.

22. The apparatus of claim 17, wherein the traffic associated with the second wireless signaling connection includes traffic to establish the second wireless signaling connection.

23. The apparatus of claim 17, wherein the traffic associated with the second wireless signaling connection includes traffic of a transport layer protocol, a network layer protocol, a control protocol, or application protocol of the second wireless signaling connection.

24. The apparatus of claim 17, wherein the second wireless signaling connection is for signaling procedures between a base station co-located with the first node and a serving base station of the first node.

25. The apparatus of claim 17, wherein the second wireless signaling connection is for signaling procedures between a logical node hosting a control plane part of a packet data convergence protocol (PDCP) of a base station and a logical node co-located with the first node hosting a user plane part of the PDCP protocol of the base station.

26. The apparatus of claim 17, wherein the second wireless signaling connection is for signaling procedures for an interconnection of a base station co-located with the first node to a core network.

27. The apparatus of claim 17, wherein the second wireless signaling connection is for a signaling protocol between a core network control plane function and a user plane function co-located with the first node.

28. The apparatus of claim 17, wherein the at least one processor is configured to forward traffic of the second signaling connection to or from a third node.

29. An apparatus for wireless communication, comprising:
   means for establishing a first wireless signaling connection between a first node and a second node, wherein the first node provides a network function for local traffic between the first node and a first user equipment (UE); and
   means for encapsulating or decapsulating traffic associated with a second wireless signaling connection within the first wireless signaling connection at the first node, wherein the second wireless signaling connection corresponds to a non-F1 interface of a control plane or user plane network function that terminates at the first node, wherein the second wireless signaling connection is used to coordinate management of the network function for local traffic between the first node and a first user equipment (UE), and wherein the first node includes a second UE or an integrated access and backhaul mobile terminal (IAB-MT) that provides the network function for the first UE.

30. A non-transitory computer-readable medium storing computer-executable instructions that when executed by a processor cause the processor to:
   establish a first wireless signaling connection between a first node and a second node, wherein the first node provides a network function for local traffic between the first node and a first user equipment (UE); and
   encapsulate or decapsulate traffic associated with a second wireless signaling connection within the first wireless signaling connection at the first node, wherein the second wireless signaling connection corresponds to a non-F1 interface of a control plane or user plane network function that terminates at the first node, wherein the second wireless signaling connection is used to coordinate management of the network function for local traffic between the first node and a first user equipment (UE), and wherein the first node includes a second UE or an integrated access and backhaul mobile terminal (IAB-MT) that provides the network function for the first UE.

\* \* \* \* \*